United States Patent
Ligman et al.

(10) Patent No.: US 9,485,268 B2
(45) Date of Patent: Nov. 1, 2016

(54) SYSTEM, METHOD AND APPARATUS TO VISUALLY CONFIGURE AN ANALYSIS OF A PROGRAM

(71) Applicant: International Business Machines Corporation, Armonk, NY (US)

(72) Inventors: Joseph W. Ligman, Wilton, CT (US); Marco Pistoia, Amawalk, NY (US); Omer Tripp, Har Adar (IL)

(73) Assignee: International Business Machines Corporation, Armonk, NY (US)

( * ) Notice: Subject to any disclaimer, the term of this patent is extended or adjusted under 35 U.S.C. 154(b) by 99 days.

(21) Appl. No.: 14/245,140

(22) Filed: Apr. 4, 2014

(65) Prior Publication Data

US 2015/0288705 A1 Oct. 8, 2015

(51) Int. Cl.
*G06F 17/00* (2006.01)
*H04L 29/06* (2006.01)

(52) U.S. Cl.
CPC .......... *H04L 63/1433* (2013.01); *H04L 63/20* (2013.01)

(58) Field of Classification Search
CPC .......... H04L 63/1416; H04L 63/1408; H04L 63/1441; H04L 63/1458
USPC ............... 713/153–154, 187–188, 193–194; 726/1, 13, 22–33; 709/206, 249, 389
See application file for complete search history.

(56) References Cited

U.S. PATENT DOCUMENTS

| 8,381,193 | B2 | 2/2013 | Cervantes | |
| 8,649,791 | B1* | 2/2014 | Wohld | H04W 36/0083 455/446 |
| 2007/0250699 | A1 | 10/2007 | Dube et al. | |
| 2012/0222123 | A1* | 8/2012 | Williams | G06F 21/577 726/25 |

OTHER PUBLICATIONS

IPCOM000178233D; "Improved Method for Visual Programming Object Configuration"; An IP.com Prior Art Database Technical Disclosure; http://ip.com/IPCOM/000178233D; Jan. 20, 2009.
IBM et al.; "Visual Configurator System for Configuring and Ordering IBM Products"; An IP.com Prior Art Database Technical Disclosure; http://ip.com/IPCOM/000108597D; Mar. 22, 2005.

* cited by examiner

*Primary Examiner* — Evans Desrosiers
(74) *Attorney, Agent, or Firm* — Harrington & Smith

(57) ABSTRACT

A method extracts views from an application program, where at least some extracted views include at least one view component, and presenting the extracted views to a user. In response to the user selecting a view component in a presented extracted view, the method presents a form to the user having a plurality of vulnerability types indicated for the selected view component and, for each vulnerability type, provides an ability for the user to set an indicator in the form as to indicate whether the view component is at least one of a source or a sink. The method further includes saving the form containing the user's input in conjunction with a user-provided label for the selected view component and a unique identification of the selected view component, and deriving an analysis policy configuration from the saved form that is formatted for use by a program security analyzer.

15 Claims, 7 Drawing Sheets

- Application: com.ibm.research.workplacedashboard
  - Device: 480800

Page Views: Disabled

Location: Disabled

Network: Disabled

- View: com.ibm.research.workplacedashboard.WorkplaceDashboard.png

ListView ( Messages View )

- View: Storage Network

Storage ( Messages Network Connection )

- View: com.ibm.research.workplacedashboard.LoginViewActivity.png

EditText ( Password Field )

- View: Storage Internal

Storage ( Internal Passwords )

FIG. 5

SYSTEM, METHOD AND APPARATUS TO VISUALLY CONFIGURE AN ANALYSIS OF A PROGRAM

TECHNICAL FIELD

The embodiments of this invention relate generally to data processing systems and computer software and, more specifically, relate to user interface (UI) security evaluation and analysis for an application program such as one intended to be executed on a mobile platform (a mobile application).

BACKGROUND

Configuring the static security analysis of a conventional Web application can be a complex task at least for the reason that it requires a number of activities to be performed. For example, the activities can include identifying the application entry points; identifying so-called "sources", which are the points in the program that have the potential to introduce tainted values (in integrity problems) of confidential values (in confidentiality problems) into the program; identifying so-called "sinks", which are security-sensitive points in the program that may use tainted values and/or that may release information computed based on confidential values; and identifying so-called "downgraders" which are the program points intended to eliminate taint from values. The downgraders may be referred to as "sanitizers" that can, for example, obfuscate confidential data before it is released ("declassifiers").

Problems can arise due to the fact that one or more of these activities may be manually performed. This typically requires that the person performing these activities be highly skilled. The manual performance of these activities can also result in errors that can result in one or more application security vulnerabilities being overlooked.

If these activities are performed automatically (algorithmically) the algorithm may, for example, classify all identified text input fields in views generated by the application as being sources, and all text display fields as being sinks. In this case the task of the person who must analyze the output of the analyzer becomes complicated and prone to error.

SUMMARY

In a first aspect thereof the embodiments of this invention provide a method that includes extracting views from an application program, where at least some extracted views comprise at least one view component; presenting the extracted views to a user; in response to the user selecting a view component in a presented extracted view, presenting a form to the user having a plurality of vulnerability types indicated for the selected view component and, for each vulnerability type, providing an ability for the user to set an indicator in the form to indicate whether the view component is at least one of a source or a sink; saving the form containing the user's input in conjunction with a user-provided label for the selected view component and a unique identification of the selected view component; and deriving an analysis policy configuration from the saved form that is formatted for use by a program security analyzer.

In another aspect thereof the embodiments of this invention provide a system comprised of at least one data processor connected with at least one memory that stores software instructions. The execution of the software instructions by the at least one data processor causes the system to extract views from an application program, where at least some extracted views comprise at least one view component and present the extracted views to a user. The system further operates, in response to the user selecting a view component in a presented extracted view, to present a form to the user having a plurality of vulnerability types indicated for the selected view component and, for each vulnerability type, to provide an ability for the user to set an indicator in the form as to whether the view component is at least one of a source or a sink. The system further operates to save the form containing the user's input in conjunction with a user-provided label for the selected view component and a unique identification of the selected view component; and to derive an analysis policy configuration from the saved form that is formatted for use by a program security analyzer.

In yet another aspect thereof the embodiments of this invention provide a computer program product comprised of software instructions on a computer-readable medium. Execution of the software instructions using a computer results in performing operations that comprise extracting views from an application program, where at least some extracted views comprise at least one view component and presenting the extracted views to a user. In response to the user selecting a view component in a presented extracted view, the operations further include presenting a form to the user having a plurality of vulnerability types indicated for the selected view component and, for each vulnerability type, providing an ability for the user to set an indicator in the form to indicate whether the view component is at least one of a source or a sink; saving the form containing the user's input in conjunction with a user-provided label for the selected view component and a unique identification of the selected view component; and deriving an analysis policy configuration from the saved form that is formatted for use by a program security analyzer.

BRIEF DESCRIPTION OF THE SEVERAL VIEWS OF THE DRAWINGS

FIG. 5 shows an example of an analysis policy configuration that is generated in response to the user's interaction with the workplace dashboard of FIG. 3.

DETAILED DESCRIPTION

Figure 1:
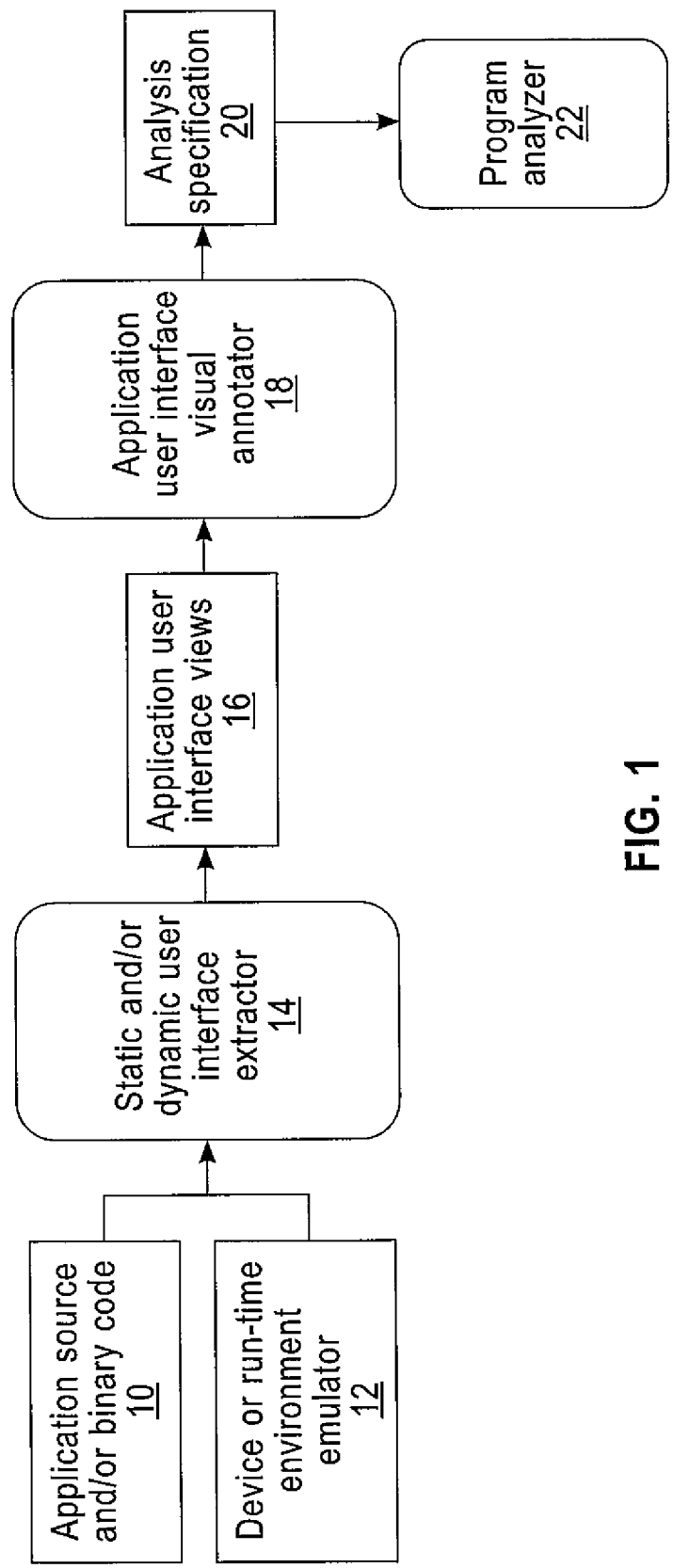
FIG. 1 shows a general flow diagram, flow chart and system that is descriptive of the operation of the invention to extract, render and process views from an application.

One advantage of configuring the security analysis of an application program, such as a Web application, is that entry points, sources, sinks and downgraders are often standard Application Program Interface (API) calls. Some security analysis tools, such as IBM Security AppScan Source™, come pre-configured to analyze such programs. In particular, they contain a database of sources, sinks and sanitizers that allow for an automated running of the analysis of an application.

The inventors have realized that not all applications are amenable to this type of security analysis. One particular type of application that can be problematic is the mobile application (e.g., one designed to be executed on a smartphone or tablet or other type of mobile user platform). Such mobile applications are typically very UI intensive. However, not all of the text input into text boxes can be considered a source for integrity and confidentiality violations, and not all of the program points that use values input into a text box need be considered integrity or confidentiality sinks. As but one example, a certain text box that is intended to accept a user's name may not represent a security issue (may not normally be considered to be source), while another text block that is intended to accept some private data of the user (e.g., a social security number or a credit card number or a customer number at a financial institution) can clearly present a security issue and should be recognized as a source.

Note also that some text entry fields can represent a security risk if some malicious person instead were to input executable code, such as a Java script, or an executable command.

If the static application analysis tool is configured so as to treat during an analysis all UI input boxes as sources and all security-sensitive computations as sinks, the static analysis tool will generate a prohibitive number of false positives (i.e., positive for being sources or sinks). This can discourage the user of the static analysis tool from giving proper credibility to those issues discovered and reported by the tool.

An alternative approach to this problem involves manually identifying the specific program points that can act as entry points, sources, sinks and downgraders. This approach however is tedious, time consuming and error prone since it requires properly identifying such program points in the application's source code. However, not everyone is familiar with a particular application's source code and, in particular, this task requires that the security administrator also be a programmer and, specifically, a programmer familiar with the source code of every application requiring security analysis. Another source of difficulty is that this task requires partitioning the entry point/source/sink/downgrader rules into sets of specific issues, such as Cross-site scripting (XSS), Structured Query Language (SQL) injection, Command injection, and confidentiality, thereby even further complicating the task of the security administrator.

The use of XSS enables an attacker to inject client-side executable script into a Web page (e.g., a social media page) that is viewed by others. SQL injection is a code injection technique that can be used to attack data-driven applications, where malicious SQL statements are inserted into an entry field for execution (e.g., to gain unauthorized access to database contents of the site being attacked). In Command injection (also known as shell command injection) a malicious person can enter HTML code into an input, such as an entry in a form field, to gain for example unauthorized access to data and/or network resources. If an authorized user later accesses the modified Web page, the browser of that user can interpret the malicious HTML code resulting in undesired commands to execute in the authorized user's computer and possibly the user's network.

The embodiments of this invention overcome these various problems by allowing for visually configuring the analysis of a program such as an application. The use of the embodiments of this invention does not require any knowledge of the application's source code. A non-program developer functioning as a security administrator, also referred to below for convenience as a "user", can readily configure the analysis of a program simply by interacting with the UI views of application, which are pre-computed. No programming experience by the user is necessary. The use of the embodiments of this invention allow for the user to select precise application entry points, sources, sinks and downgraders in a visual manner, virtually eliminating all false positives due to analysis misconfiguration.

The configuration of entry points, sources, sinks and downgraders is important in order for a security analysis to report correct results. For the purposes of describing the embodiments of this invention an "entry point" can be considered as a program point from which the execution of a program can be started. For example, for a Java application an entry point is its main( )method; for a Java library, an entry point is any public or protected method. A "source" can be considered as a program point in which information that will later be used in security-sensitive computations can be entered into the program. A "sink" can be considered as a program point where a security-sensitive computation is performed. For example, when the security concern is information flow integrity, a source is a program point in which an end user is allowed to enter data into a Web form, and that data will later be used at a sink to form a Structured Query Language (SQL) query to access a database, or will be printed as part of an HTML page. Forming a SQL query and printing an HTML page are both security-sensitive operations because a maliciously crafted SQL instruction could compromise the integrity of a database, and printing text to an HTML page could cause the execution of arbitrary code on the browser if that text contains non-validated JavaScript code. When the security concern is information-flow confidentiality, a source is a program point where confidential information enters the program, and a sink is a program point that discloses information to potentially unauthorized users. A confidentiality violation may occur any time there is a flow that connects a confidentiality source to a confidentiality sink. Flows from sources to sinks are allowed only if the information flowing from a source to a sink has been properly processed to prevent security violations from occurring. This is the task of the "downgrader". In integrity, a downgrader is also called a "sanitizer" and its purpose is to eliminate from the information being transmitted any sequence of characters that may lead to a violation when passed to a sink. In confidentiality, a downgrader is also known as a "declassifier" and includes a procedure that obfuscates confidential information sufficiently so as to prevent unauthorized users from learning a secret.

The embodiments of this invention exhibit all of some of the following features. In one aspect thereof the invention uses a combination of static and dynamic analysis to reconstruct the views of the application. For each view, the invention captures the view's snapshot or screenshot (i.e., the visual appearance of the view as it would be presented on a display device to a person running the application) and stores the screenshot in memory, such as in a database. For each screenshot, the invention maintains a mapping of each UI component (e.g., text boxes) within the original view with their respective geometric coordinates and size. These enhanced screenshots may be referred to as "smart screenshots". The invention iteratively presents all of the smart screenshots to the security administrator. The security administrator is then enabled to visually examine and select individual UT components from the smart screenshots and specify whether the selected components are entry points, sources, sinks, and/or downgraders.

For example, if a particular text entry field is labeled as "Street Address" the security administrator might ignore that text entry field, while if another text entry field in the same screen view is labeled as "Social Security Number" the security administrator would likely designate that field as a source. Some fields, such as "Birthdate" might for a certain application be considered as a non-source, while in another application the "Birthdate" might be considered as a source if the data entered into this field is displayed in the clear by the application thereby permitting another user of the application to learn the age of other individuals and to take, for example, some age-discriminatory action.

The invention further allows for attaching a label to each entry point, source, sink and downgrader, as well as specifying a vulnerability or vulnerabilities to which every selected entry point, source, sink or downgrader refers to. The invention further allows for selecting entry points, sources, sinks and downgraders even when these do not have a specific UI representation (for example, network connections or accesses to a contacts database of a smartphone).

The invention further can save the configuration performed by the security analyst/security administrator and translate the configuration into a static analysis engine-specific protocol for use in a subsequent security analysis performed by a security analysis tool.

FIG. 1 shows a general flow diagram, flow chart and system that is descriptive of the operation of the invention. There is provided an application source and/or binary code 10 (application 10) and in some embodiments a device or run-time environment emulator 12.

In the embodiments of this invention the application 10 can be one written by an enterprise or organization for internal use, or it can be a third party application written for use by a particular enterprise or application, or it could be a third party application written to be published in an application store to be downloaded for use by any number of potential users. The application 10 can be one developed to be executed on a mobile platform device, such as a smart phone or a tablet, or on a PC or a workstation type device, or on any combination of types of host devices. While the invention is described below primarily in the context of the analysis of a mobile application (i.e., applications intended to be run on a mobile device platform) the invention is not restricted for use with mobile applications. The application 10 can be a Web application, or a native application, or a hybrid Web/native application.

Figure 2:
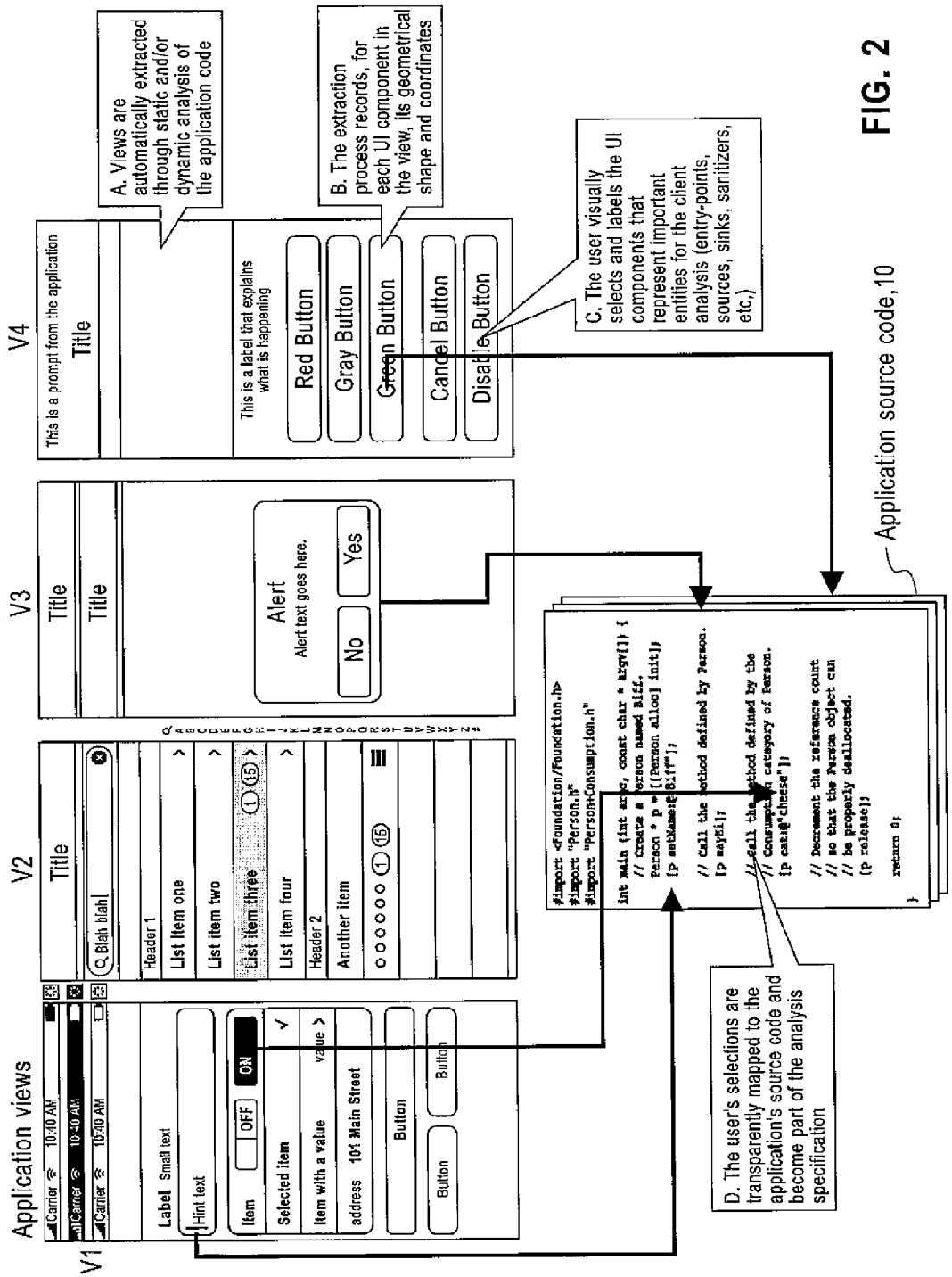
FIG. 2 illustrates representative extracted application views and the interaction of a user of the system, such as a security administrator, with the extracted views.

The application 10 and the emulator 12 are applied to a static and/or dynamic user interface (UI) extractor 14 that operates in accordance with this invention. Referring also to FIG. 2, at Block A the UI extractor 14 operates to automatically extract through static and/or dynamic analysis the views present in the application code 10. Note that if only a static view extraction is used then the emulator 12 may not be needed.

Figure 4:
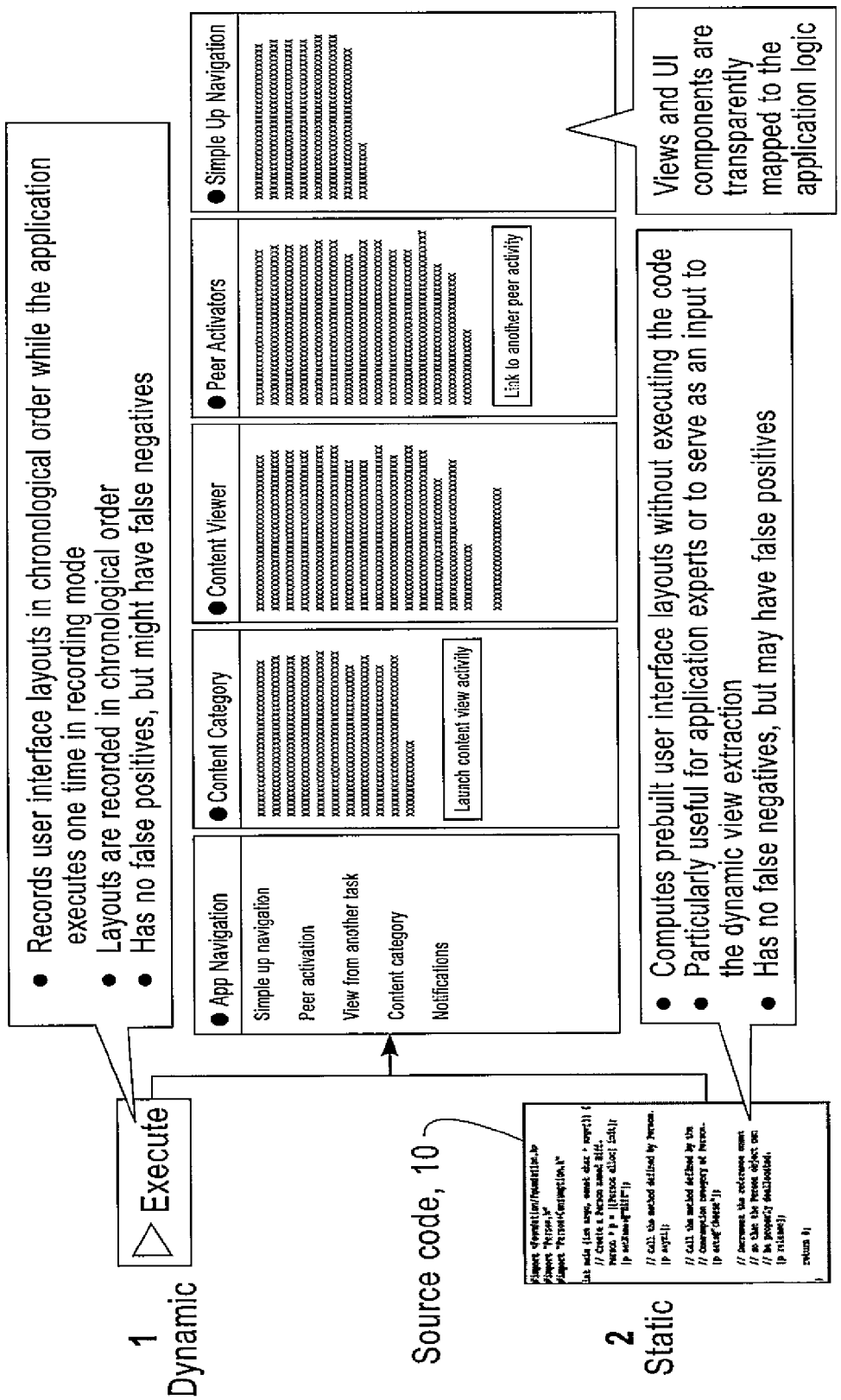
FIG. 4 shows the use of static and/or dynamic view extraction.

Reference can be made to FIG. 4 that shows the use of static and/or dynamic view extraction. For the dynamic case (1) the operation of the invention at block 14 of FIG. 1 records user interface layouts in chronological order while the application executes one time in the recording mode. The view layouts are recorded in chronological order as they would appear to a user of the application. FIG. 4 shows as a non-limiting example five views (screenshots) that are extracted from an application under analysis, where the contents (e.g., UI contents) and layout of each view (screenshot) are application-specific. This approach generally produces no false positives, but may have false negatives. For the static analysis case (2) the invention computes prebuilt user interface layouts without executing the source code 10. This approach can be particularly useful for application experts, or to serve as an input to the dynamic view extraction (2). This approach generally has no false negatives, but may have false positives.

FIG. 2 shows four representative extracted views (V1, V2, V3 and V4). In a typical application, e.g., such as one intended to be executed on a mobile platform, there could be more or less than four views present. Each of the views V1-V4 contains some number of view components (UI components) such as text entry boxes, text display boxes and buttons. The views can be extracted in the dynamic fashion by emulating the execution of the application code in a recording mode to determine what views are presented. The views can also be extracted in the static fashion by an automated and/or human analysis of the application's source code to identify declared application modules and elements that correspond to displayable views and the components of those views. For example, the automated and/or human analysis can locate the presence of EditText and ViewText controls in Android source code.

At Block B the UI extractor 14 can operate to record, for each UI component that is present in a view, the geometrical coordinates of the component. This can also include recording the shape of the component and/or the screen area covered by the component. The screen coordinates of a particular component can be deemed to represent an (unique) identification of that component in the particular view in which the component occurs.

Figure 3:
FIG. 3 illustrates a workplace dashboard that is presented by the system of FIG. 1 to a user of the system that enables the user, upon selecting a particular view component, to assign a tracking label classify the view component as being one of a source or a sink.

The flow depicted in FIG. 1 thus creates the application user interface views 16 and can then display them to the user analyst (security administrator) of the system. In the example of FIG. 2 the four extracted views V1-V4 can be displayed together or sequentially. The flow then progresses to the application UI visual annotator 18. As is shown in FIG. 2 at Block C the security administrator visually selects and labels those UI components that represent important entities for the client analysis (e.g., entry-points, sources, sinks, sanitizers, etc.). This can be achieved through the use of a displayable form, also referred to herein as 'workplace dashboard', where, as shown in FIG. 3, upon the security administrator selecting a particular view component the security administrator is presented with a screen where a tracking label is assigned to the component and the user is enabled to classify (set) the view component as being one of a source or a sink. A list of vulnerability types can be presented such as, but not limited to: Cross-site scripting (XSS), Structured Query Language (SQL) injection, Command injection, and confidentiality. The security administrator is then enabled to check one or more of these vulnerability types as being a source or a sink and then save the presented screen (the completed form), such as to a policy filter.

It can be noted once more that the security administrator is not required to review or have any knowledge of the underling application source code 10. The security administrator is not required to have any programming skills at all. The security administrator instead is presented with the pre-extracted application views and the view components and can then make a determination as to whether each particular view component represents any potential security vulnerability and, if so, what type of security vulnerability or vulnerabilities could be present.

In FIG. 1, block 20 (analysis specification) and in FIG. 2, block D, the user's selections can be transparently mapped to the application's source code 10 to become a part of an analysis specification or policy configuration that can then be input to a program analyzer tool (FIG. 1, block 22). One non-limiting example of a program analyzer is the above-mentioned Security AppScan Source™.

FIG. 5 shows a non-limiting example of an analysis policy configuration. In this example it can be seen that a storage network is identified for an EditText Password field, and that the storage is identified as being internal (Internal Passwords). This analysis policy configuration file can then be input to the program analyzer 22 as shown in FIG. 1.

Once the program analyzer 22 receives the policy configuration file as an input it can use it for subsequent analyses of the application to which the policy configuration file applies. As an example, a static program analyzer, which typically models the execution of the program as a "call graph"—a graph in which nodes represent methods and edges represent method calls—will instantiate nodes without predecessor nodes as entry points and will initiate the building of the call graph from those nodes. Once the call graph is constructed the static program analyzer will identify the nodes in the call graph corresponding to sources, sinks and downgraders, and will look for flows of information that from a source can reach a sink without passing through a downgrader.

To summarize the description of the examples of the embodiments of this invention, the security administrator is presented with the extracted views in the form of snapshots or screenshots. Each UI component within each view snapshot is sensitive to the security administrator's interaction via the geometrical coordinate and shape information previously recorded. The security administrator can also be presented with non-visual activities and resources that the application program can access. Non-limiting examples of such non-visual activities and resources can include: (A) the application stores private primitive data in key-value pairs; (B) the application stores private data on the device internal memory; (C) the application stores public data on a shared external storage. In response to this presented information the security administrator can interact with the workplace dashboard to manually and visually select UI components and non-visual activities and resources, assign a policy label to these selected components, activities and resources, and specify what role the selected components, activities and resources will have on the final analysis. No interaction with the application's source code 10 is necessary and no programming experience is required by the security administrator. The analysis policy configuration (an example of which is shown in FIG. 5) is saved and then given as input to the program analyzer 22.

This invention is not directed per se to discovering vulnerabilities, rather the use of this invention facilitates the configuration of a vulnerability-detection tool through a graphical user interface (GUI) based on UI views extracted from the application using at least one of static and dynamic analysis. The use of invention provides for a visual and manual configuration of a security analysis by a security administrator and then formats and maps the results as input to any desired security analyzer.

It can be noted with regard to FIG. 1 that uploading the application 10 is but one suitable technique to make the application 10 available for analysis. In other embodiments, and by example, the application 10 can be input from a transmission process that could be considered as a 'peer' transmission from an application distribution system (e.g., an enterprise application store). In still other embodiments a memory device, such as a memory stick or a portable disk, that has the application 10 recorded therein could be connected and the application read from the memory device to a memory of a host system.

Note that in some embodiments the views extracted from the application 10 can be analyzed by a person who performs the role of the security administrator, while in other embodiments the views extracted from the application 10 can be analyzed by software programmed to assume the role of a security administrator (i.e., the software is pre-configured to function as an expert security administrator). In some embodiments of this invention both a human security administrator and a software-embodied security administrator can cooperate to perform the tasks indicated in block 18 of FIG. 1.

Figure 6:
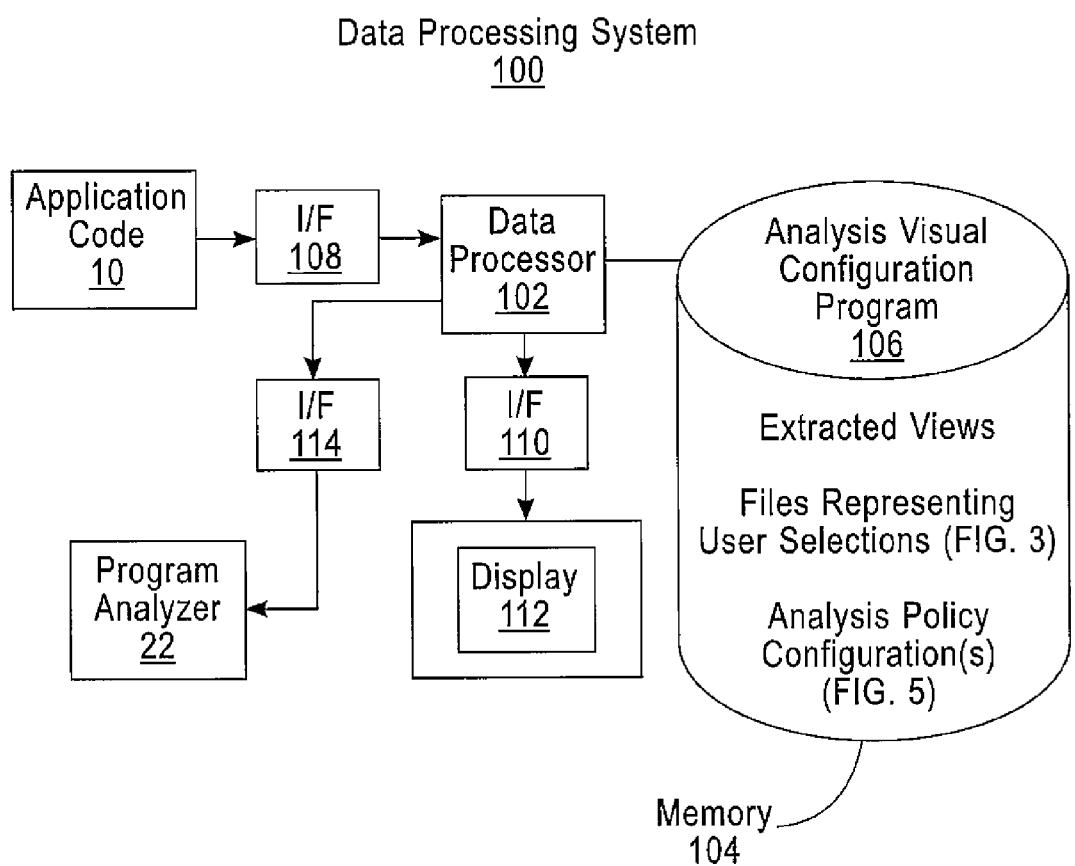
FIG. 6 shows an example of a data processing system that can be used to embody one or more of the components of the system shown in FIG. 1.

FIG. 6 shows an example of a data processing system 100 that can be used to embody one or more of the components of the system shown in FIG. 1. For example, the data processing system 100 includes at least one data processor 102 connected with at least one computer-readable medium such as a memory 104 that stores computer readable program instructions 106 configured to perform the various operations described above to. For example, the computer readable program instructions 106 can be configured to execute the static analysis and/or the dynamic analysis, the presentation of the views (e.g., V1-V4 as shown in FIG. 2) extracted from the application 10, the recording and saving of the user's selections as in FIG. 3, and the construction and formatting (for a selected program analyzer 22) of the analysis policy configuration(s) as in FIG. 5. The memory 104 is also configured to store, for example, a hierarchy of extracted screen images (views) that result from the execution of the static and/or dynamic analysis, the files representing the user's selections (FIG. 3) and the analysis policy configuration(s) (FIG. 5). The data processing system 100 further includes a first interface (I/F) 108 that is configured to receive the application 10 from some application source (e.g., a third party application developer or an internal, enterprise-associated application developer) and a second interface 110 connected with a graphical user interface (GUI). The GUI includes a visual user interface and is configured to visualize the extracted views and the workplace dashboard (FIG. 3) to a user of the system 100 (to the security administrator) via any suitable visual user interface. The visual user interface can include a display device 112. The GUI also includes some type of pointing device, such as a mouse, enabling the security administrator to interact with the displayed views and the workplace dashboard (e.g., as shown in FIG. 3). Also shown in FIG. 6 is a third interface 114 for connecting to the program analyzer 22 through which the analysis specification(s) 20 (FIG. 5) can be output. In some embodiments the interface 114 can be an internal interface when the program analyzer software 22 is instantiated on the same platform as the data processor 102. The interfaces 108, 110 and 114 can each be directly or indirectly connected to an associated network that can be embodied as a wired network or as a wireless network.

In some embodiments the data processing system 100 can be physically located and instantiated at an enterprise, while in some other embodiments some or all of the data processing system 100 and related modules, such as the program analyzer 22, can be implemented as a virtual system or systems hosted in the cloud either by the enterprise itself or by a third party cloud provider. That is, and in general, the computer program product that implements the embodiments of this invention and the program security analyzer 22 can be embodied on the same platform, or the computer program product and the program security analyzer 22 can be embodied on different platforms, where the platform or platforms can comprise one or both of a hardware instantiation or a virtual, cloud-based instantiation.

Figure 7:
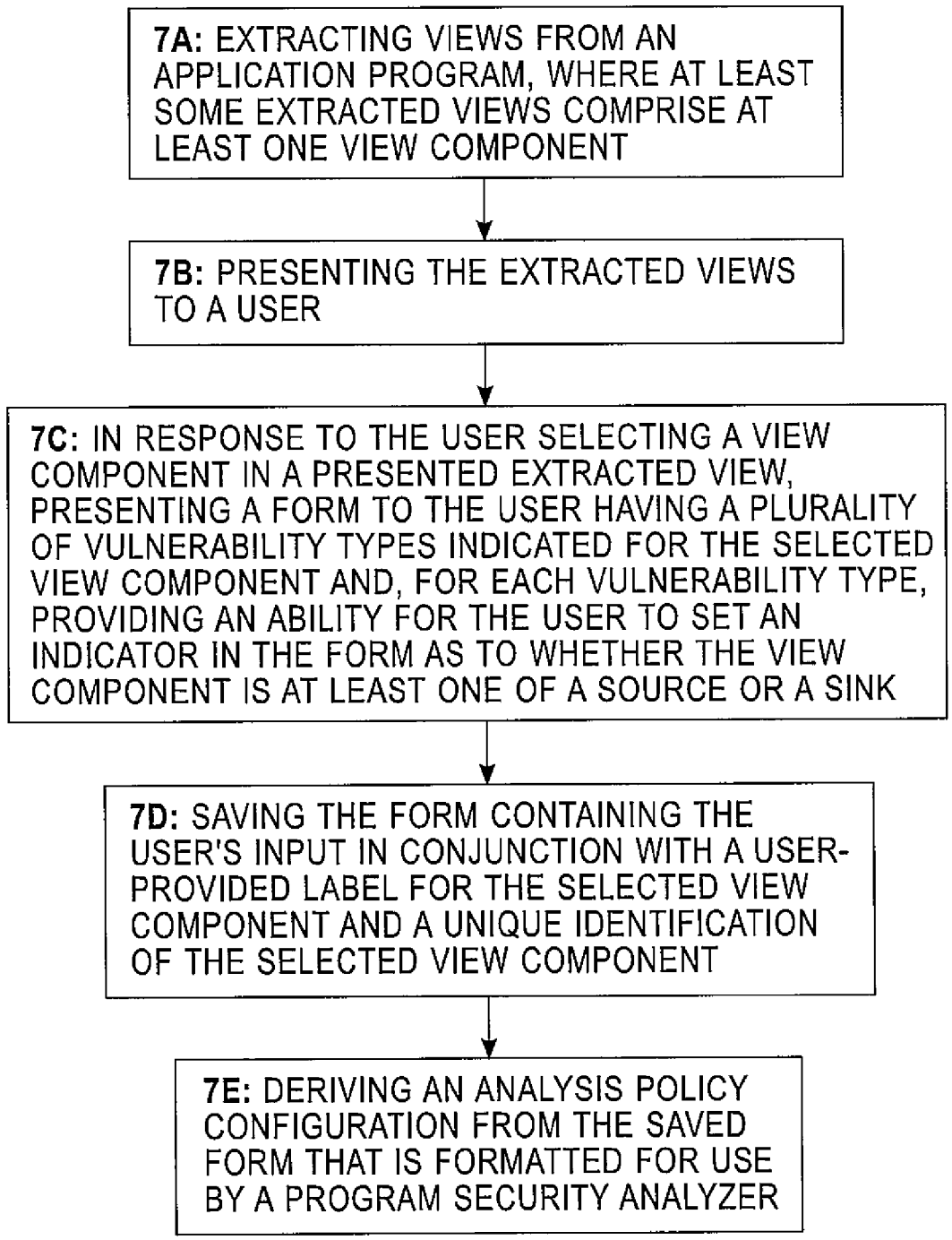
FIG. 7 is a logic flow diagram (a flow chart) that illustrates a method in accordance with this invention.

FIG. 7 is a logic flow diagram, also referred to as a flow chart, which illustrates a method in accordance with the examples of the embodiments of this invention. At Block 7A there is a step of extracting views from an application program, where at least some extracted views comprise at least one view component. At Block 7B there is a step of presenting the extracted views to a user. At Block 7C there is a step performed, in response to the user selecting a view component in a presented extracted view, of presenting a form to the user having a plurality of vulnerability types indicated for the selected view component and, for each vulnerability type, providing an ability for the user to set an indicator in the form as to whether the view component is at least one of a source or a sink. At Block 7D there is a step of saving the form containing the user's input in conjunction with a user-provided label for the selected view component and a unique identification of the selected view component. At Block 7E the method performs a step of deriving an analysis policy configuration from the saved form that is formatted for use by a program security analyzer.

The present invention may be a system, a method, and/or a computer program product. The computer program product may include a computer readable storage medium (or media) having computer readable program instructions thereon for causing a processor to carry out aspects of the present invention.

The computer readable storage medium (such as memory 104) can be a tangible device that can retain and store instructions for use by an instruction execution device (such as the data processor 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As such, various modifications and adaptations may become apparent to those skilled in the relevant arts in view of the foregoing description, when read in conjunction with the accompanying drawings and the appended claims. As but some examples, the use of other similar or equivalent vulnerability types may be used by those skilled in the art. However, all such and similar modifications of the teachings of this invention will still fall within the scope of this invention.

What is claimed is:

1. A method, comprising:
    extracting views from an application program, where at least some extracted views comprise at least one view component;
    presenting the extracted views to a user;
    in response to the user selecting a view component in a presented extracted view, presenting a form to the user having a plurality of vulnerability types indicated for the selected view component and, for each vulnerability type, providing an ability for the user to set an indicator in the form to indicate whether the view component is at least one of a source or a sink;
    saving the form containing the user's input in conjunction with a user-provided label for the selected view component and a unique identification of the selected view component; and
    deriving an analysis policy configuration from the saved form that is formatted for use by a program security analyzer,
    where the unique identification comprises at least geometric coordinates of the selected view component in the view containing the selected view component, and where
    extracting views is performed dynamically by emulating the execution of the application program and recording in chronological order the views as they are generated by the application program.

2. The method of claim 1, where extracting views is also performed statically by an analysis of the application program source code.

3. The method of claim 1, where the vulnerability types comprise at least Cross-site scripting (XSS), Structured Query Language (SQL) injection, Command injection, and confidentiality.

4. The method as in claim 1, where saving the form containing the user's input further comprises saving at least one of non-visual activities and resources associated with the selected view component.

5. The method of claim 1, where providing the ability for the user to set an indicator in the form further enables the user to designate whether the selected view component is associated with an entry point or with a downgrader.

6. A system, comprised of at least one data processor connected with at least one memory that stores software instructions, where execution of the software instructions by the at least one data processor causes the system to:
    extract views from an application program, where at least some extracted views comprise at least one view component;
    present the extracted views to a user;
    in response to the user selecting a view component in a presented extracted view, present a form to the user having a plurality of vulnerability types indicated for the selected view component and, for each vulnerability type, provide an ability for the user to set an indicator in the form as to whether the view component is at least one of a source or a sink;
    save the form containing the user's input in conjunction with a user-provided label for the selected view component and a unique identification of the selected view component; and
    derive an analysis policy configuration from the saved form that is formatted for use by a program security analyzer,
    where the unique identification comprises at least geometric coordinates of the selected view component in the view containing the selected view component, and where
    the system extracts the views dynamically by emulating the execution of the application program and recording in chronological order the views as they are generated by the application program.

7. The system of claim 6, where the system also extracts the views statically by an analysis of the application program source code.

8. The system of claim 6, where the vulnerability types comprise at least Cross-site scripting (XSS), Structured Query Language (SQL) injection, Command injection, and confidentiality, and where the saved form containing the user's input further comprises an indication of at least one of non-visual activities and resources associated with the selected view component.

9. The system of claim 6, where the provided ability for the user to set an indicator in the form further enables the user to designate whether the selected view component is associated with an entry point or with a downgrader.

10. A computer program product comprised of software instructions on a computer-readable medium, where execution of the software instructions using a computer results in performing operations comprising:

extracting views from an application program, where at least some extracted views comprise at least one view component;

presenting the extracted views to a user;

in response to the user selecting a view component in a presented extracted view, presenting a form to the user having a plurality of vulnerability types indicated for the selected view component and, for each vulnerability type, providing an ability for the user to set an indicator in the form to indicate whether the view component is at least one of a source or a sink;

saving the form containing the user's input in conjunction with a user-provided label for the selected view component and a unique identification of the selected view component; and deriving an analysis policy configuration from the saved form that is formatted for use by a program security analyzer, where the unique identification comprises at least geometric coordinates of the selected view component in the view containing the selected view component, and where extracting views is performed dynamically by emulating the execution of the application program and recording in chronological order the views as they are generated by the application program.

11. The computer program product of claim 10, where extracting views is also performed statically by an analysis of the application program source code.

12. The computer program product of claim 10, where the vulnerability types comprise at least Cross-site scripting (XSS), Structured Query Language (SQL) injection, Command injection, and confidentiality.

13. The computer program product of claim 10, where saving the form containing the user's input further comprises saving at least one of non-visual activities and resources associated with the selected view component.

14. The computer program product of claim 10, where providing the ability for the user to set an indicator in the form further enables the user to designate whether the selected view component is associated with an entry point or with a downgrader.

15. The computer program product of claim 10, where the computer program product and the program security analyzer are embodied on the same platform, or where the computer program product and the program security analyzer are embodied on different platforms, and where the platform or platforms comprise a hardware instantiation or a virtual, cloud-based instantiation.

* * * * *